Nov. 26, 1963

D. FIRTH 3,111,824

TORQUE LIMITING MECHANISM

Filed Oct. 30, 1961

INVENTOR.
DAVID FIRTH
BY *Hobbs & Easton*
ATTORNEYS

INVENTOR.
DAVID FIRTH
BY Hobbs & Easton
ATTORNEYS

Nov. 26, 1963 D. FIRTH 3,111,824
TORQUE LIMITING MECHANISM
Filed Oct. 30, 1961 4 Sheets-Sheet 3
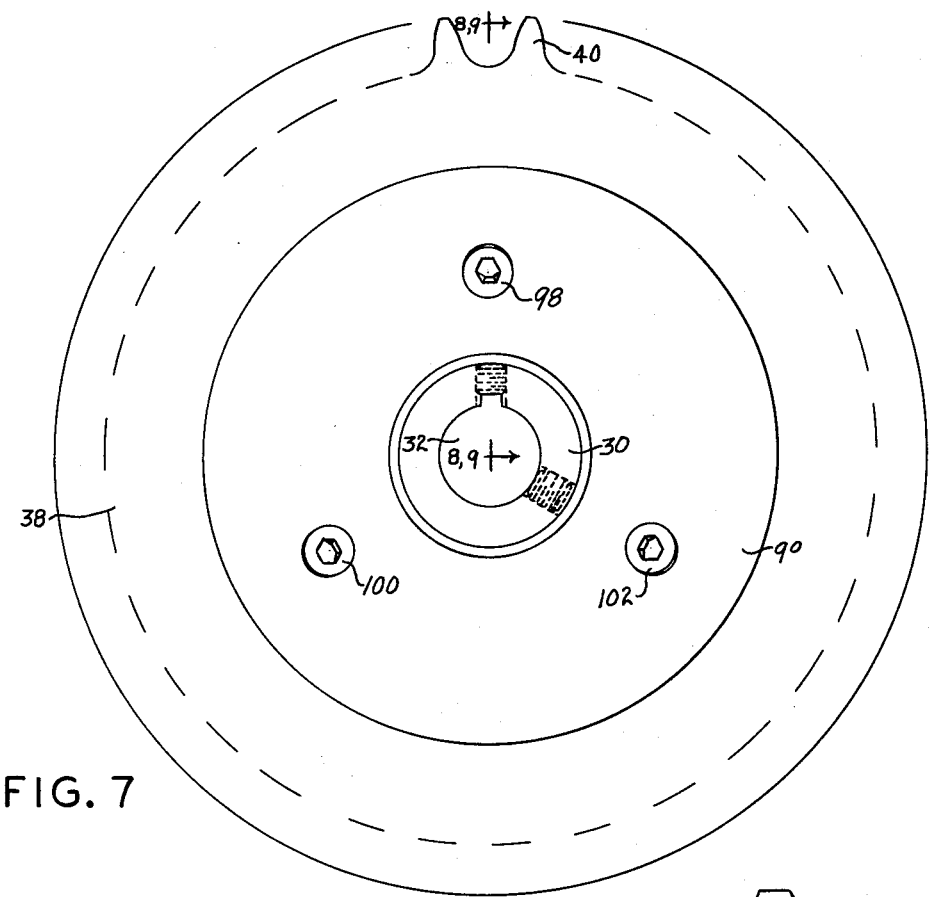
FIG. 7
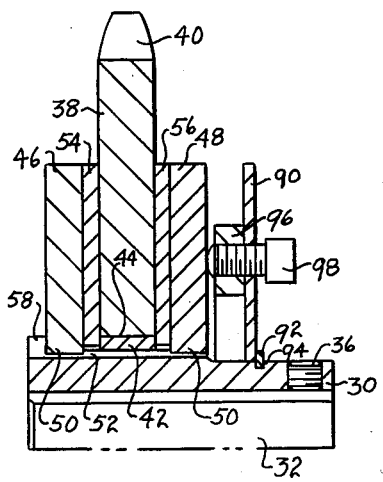
FIG. 8
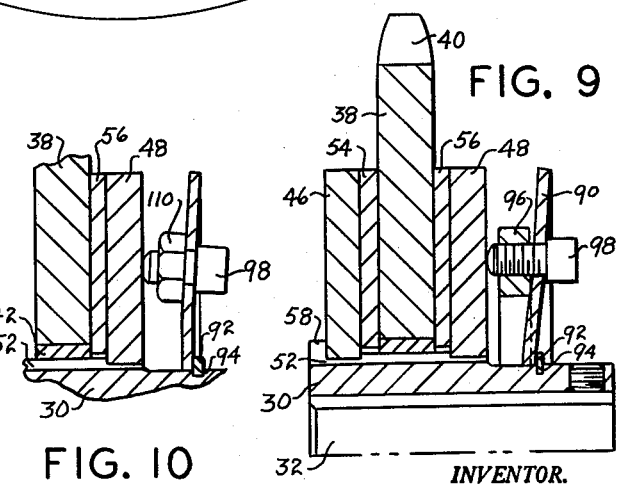
FIG. 10
FIG. 9
INVENTOR.
DAVID FIRTH
BY Hobbs & Caxton
ATTORNEYS Nov. 26, 1963 D. FIRTH 3,111,824
TORQUE LIMITING MECHANISM
Filed Oct. 30, 1961 4 Sheets-Sheet 4

INVENTOR.
DAVID FIRTH
BY
*Hobbs & Carton*
ATTORNEYS

United States Patent Office 3,111,824
Patented Nov. 26, 1963

3,111,824
TORQUE LIMITING MECHANISM
David Firth, South Bend, Ind., assignor to Dodge Manufacturing Corporation, Mishawaka, Ind., a corporation of Indiana
Filed Oct. 30, 1961, Ser. No. 148,635
9 Claims. (Cl. 64—30)

The present invention relates to a torque limiting device and more particularly to a mechanism for use in conjunction with power drives, such as, for example, sprockets, V-belt sheaves, and gears, for rendering these drives inoperable when a predetermined maximum torque load is applied thereto.

Various types of mechanisms have been incorporated in chain and belt drives which render them momentarily or temporarily inoperative when a predetermined torque load is exceeded, or which interrupts the operation of the drives when the torque load is exceeded until the overload condition is relieved and the mechanism is reset for continued operation. These mechanisms are often relatively complex, difficult to adjust to the degree of maximum torque load desired on the drive, or will not maintain the desired torque load setting over long continued operation of the drives. One of the principal objects of the invention is to provide a torque limiting device or mechanism for use in conjunction with power drives of the type consisting of sprockets, pulleys, sheaves, gears and the like, which can be easily and readily set to respond effectively to predetermined maximum torque load, without any substantial force being involved in making an adjustment, and which can be incorporated into the drive without materially increasing the size or overall space requirements beyond that normally required for similar conventional drives.

Another object of the invention is to provide a mechanism of the aforesaid type which can be calibrated during fabrication so that the desired setting can be readily determined and effectively maintained after the drive embodying the mechanism is finally installed, and which can be adjusted to the desired setting with small, easy to use, standard tools, either at the manufacturing plant or at the place of installation.

A further object is to provide a torque limiting mechanism for use in conjunction with the aforementioned types of power drives, simple in construction and operation and reliably and effectively adjustable to within narrow limits of the desired maximum torque load placed on the drive.

Still another object of the invention is to provide an overload mechanism for sprockets, sheaves and similar power drive units, which is constructed as an integral part of the unit and which does not interfere with nor change the manner in which the units are mounted on the drive or driven shafts.

Additional objects and advantages of the invention will become apparent from the following description and accompanying drawings, wherein:

FIGURE 7 is a side elevational view of a sprocket embodying another form of the present invention;

FIGURE 8 is a vertical cross sectional view of the sprocket shown in FIGURE 7, taken on line 8—8, illustrating the torque mechanism before adjustment;

FIGURE 9 is a vertical cross sectional view taken on line 9—9 of FIGURE 7, illustrating the torque mechanism thereof after adjustment;

Figure 11:
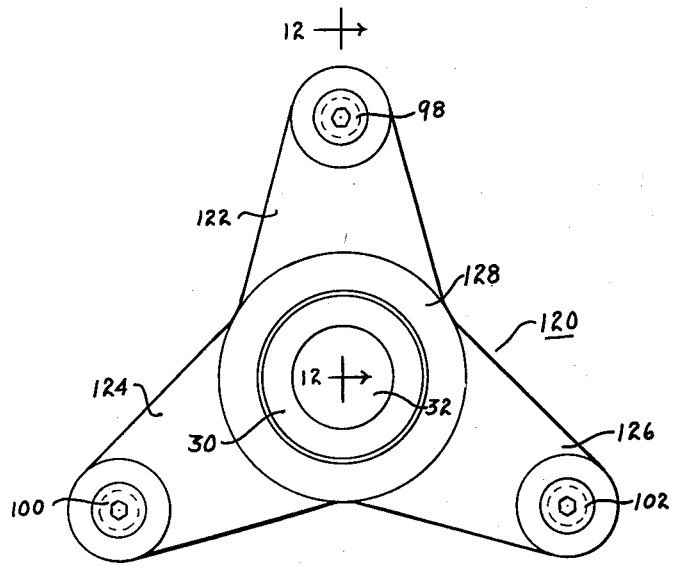
Figure 12:
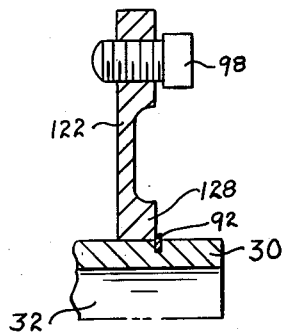

FIGURE 10 is a fragmentary view of a slightly modified form of the torque mechanism illustrated in FIGURES 7, 8 and 9; and FIGURES 11 and 12 are elevational and vertical cross sectional views, respectively, of a further variation of the present invention, the latter taken on line 12—12 of FIGURE 11.

Figure 1:
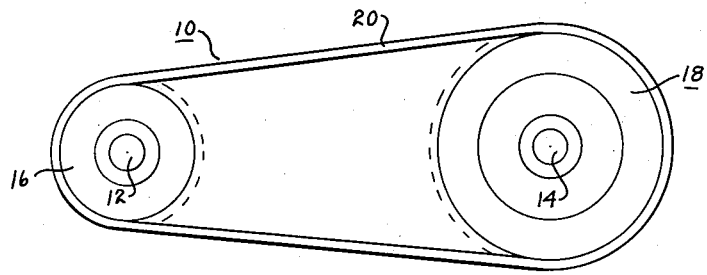
FIGURE 1 is a side elevational view of a power drive mechanism consisting of drive and driven shafts and sprockets and connecting chain.
Figure 2:
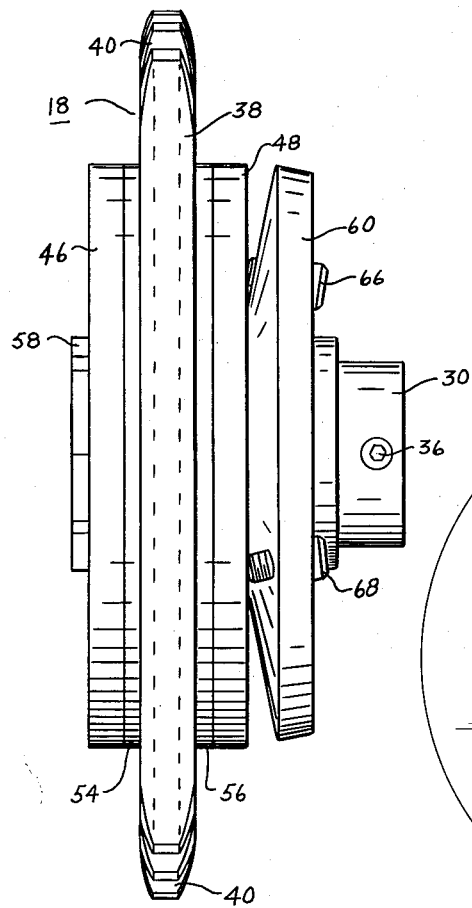
FIGURE 2 is an enlarged elevational view of the edge of the large sprocket shown in FIGURE 1.
Figure 3:
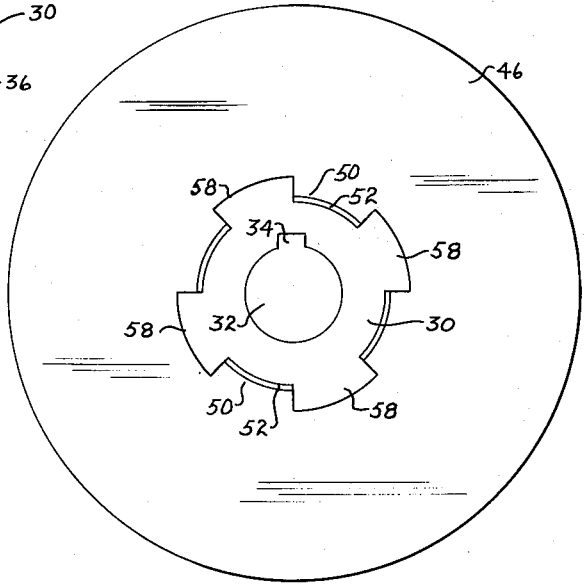
FIGURE 3 is a side elevational view of the hub and torque limiting mechanism shown in FIGURE 2.
Figure 4:
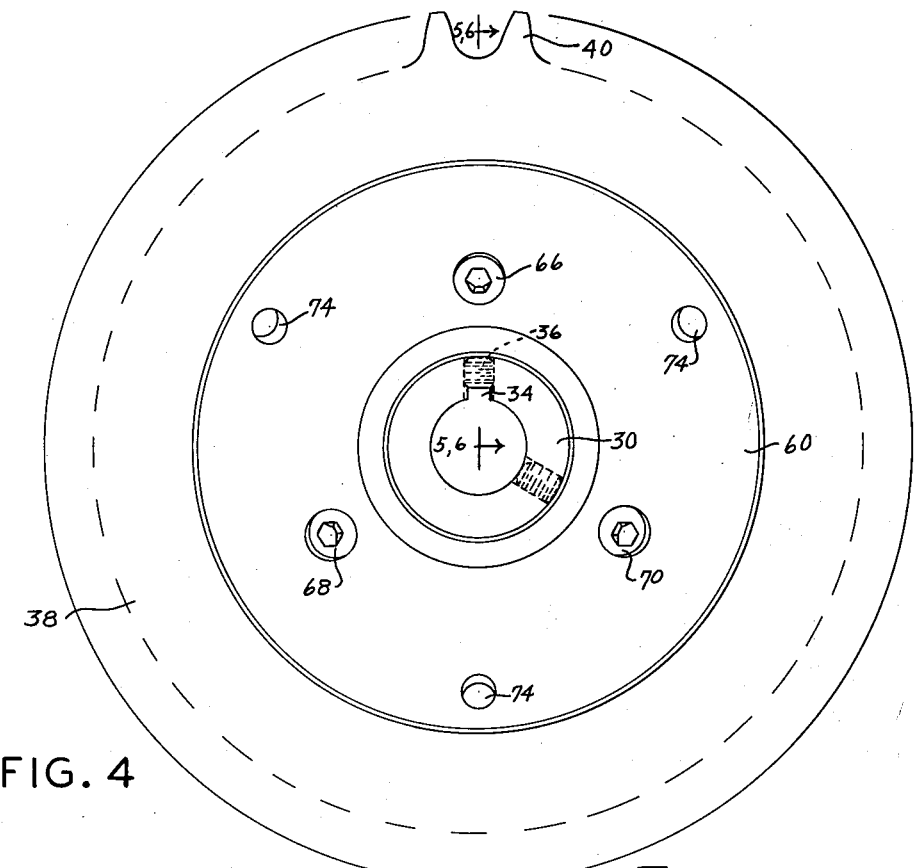
FIGURE 4 is an elevational view of the opposite side of the sprocket from that shown in FIGURE 3.

Referring more specifically to the drawings and to FIGURE 1 in particular, wherein a power drive 10 is illustrated, numerals 12 and 14 designate drive and driven shafts on which are mounted sprockets 16 and 18, respectively, and an interconnecting chain 20. The present torque limiting device or mechanism is incorporated in the driven sprocket 18, although it may be incorporated in either the drive or driven sprockets, and it may be incorporated in other types of power drives, such as for example, V-belt drives, gear trains and couplings. The present mechanism is designed for conventional power drives of the foregoing types and will protect the equipment, including the drive and driven mechanism and the drive itself, from damage from excessive torque loads by predetermined settings on the torque limiting mechanism.

The sprocket 18 embodying the present invention consists of a hub 30 having a longitudinal bore 32 therethrough, keyway 34 and set screw 36 extending through the hub for engagement with a key inserted in keyway 34 after the sprocket has been mounted onto shaft 14. A sprocket plate 38 having teeth 40 of conventional shape and design on the periphery thereof is mounted on hub 30, preferably with a sleeve bearing 42 interposed between the external surface of the hub and the inner surface 44 defining a center bore in plate 38. With this construction, sprocket plate 38 is adapted to rotate relative to hub 30 whenever a predetermined torque load on the drive is exceeded. Mounted on hub 30 on either side of sprocket plate 38 are pressure plates 46 and 48, each plate being annular-shaped and splined with the hub, the spline consisting of interlocking lugs 50 on the plates and longitudinal grooves 52 in the external surface of hub 30. The spline prevents relative rotational movement between the hub and the plates 46 and 48, while permitting longitudinal movement of the two plates on the hub, either together or relative to one another. Frictional elements 54 and 56 of any suitable friction material are secured to the inner face of pressure plates 46 and 48, respectively, and are adapted to seat against the adjacent lateral faces of sprocket plate 38, or other similar drive plates, and to grip the plate so that pressure plates 46 and 48 and sprocket plate 38 will rotate in unison throughout all normal operations of the drive. An abutment means consisting of annularly spaced lugs or bosses 58 is mounted on and preferably formed integrally with the hub adjacent one end thereof and forms a stop against which pressure plate 46 firmly seats when the torque limiting mechanism is fully assembled and adjusted for the desired maximum load.

Figure 5:
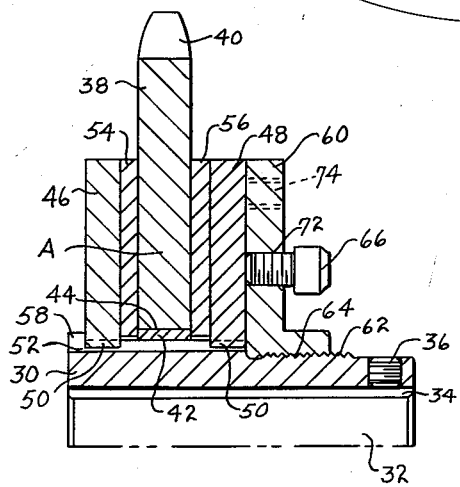
FIGURE 5 is a vertical cross sectional view of the sprocket shown in FIGURE 4, taken on line 5—5, illustrating the torque mechanism incorporated therein before adjustment.
Figure 6:
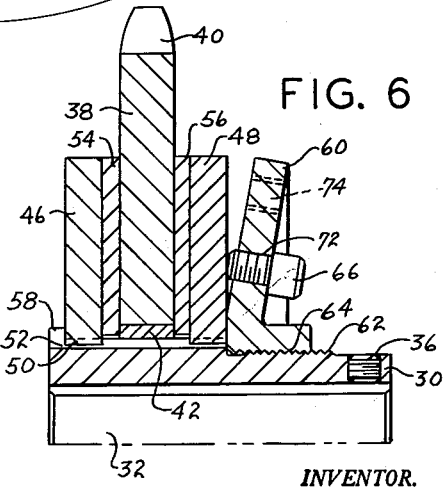
FIGURE 6 is a vertical cross sectional view, taken on line 6—6 of FIGURE 4, illustrating the torque mechanism after adjustment.

A yieldable force is applied to plates 38, 46 and 48 by a resilient annular member 60 secured to hub 30 by threaded portions 62 on the hub and 64 on the inner edge of member 60, and member 60 contains pressure adjustment screws 66, 68 and 70 threadedly received in holes 72 extending therethrough. Screws 66, 68 and 70 may be inserted either in the inner ring of holes 72 or in an outer ring of holes 74, depending upon the desired force to be applied to plates 38, 46 and 48 by resilient ring 60. When the foregoing sprocket and torque limiting mechanisms are initially assembled, the parts thereof assume the position shown in FIGURE 5, with the resilient member 60 threaded onto the hub until the inner surface thereof engages the external surface of pressure plate 48 and with pressure plate 46 seated against abutment means 58. The torque limiting mechanism is adjusted to the desired maximum load by tightening set screws 66, 68 and 70 so that the inner end thereof engages and applies pressure on the external surface of plate 48, flexing annular member 60 to the right from the position shown in FIGURE 5 to that shown in FIGURE 6, thereby firmly seating plate 46 against abutments 58 and clamping plates 38, 46 and 48 together. The flexing of member 60 applies a frictional force between frictional elements 54 and 56 and the respective surfaces of plate 38, the amount of this force increasing with the increased pressure applied by screws 66, 68 and 70. The desired maximum torque load below which no relative rotation will occur between plates 46 and 48 and sprocket plate 38 is thereby selected. In the event the torque load exceeds the desired maximum load, hub 30 and plates 46 and 48 remain stationary while sprocket plate 38 continues to rotate along with drive sprocket 16 and chain 20. Once the excess torque load has diminished to a point below that set on the torque limiting mechanism, plates 46 and 48 and hub 30 will again rotate in unison with the sprocket plate. The maximum torque load can be readily adjusted to suit requirements by adjusting screws 66, 68 and 70 without otherwise disturbing the power drive installation.

When the head of each cap screw is fully seated on the external surface of annular member 60, a preselected adjustment has been achieved. The torque limiting mechanism can be calibrated to give the desired maximum torque load by positioning member 60 at various preselected positions along threaded portion 62. A wider range of adjustments can be obtained by shifting the cap screws from the inner row of threaded holes 72 to the outer row of threaded holes 74, and making the adjustment by tightening the screws to the position at which the heads thereof seat on the external surface of member 60.

The embodiment of the present invention illustrated in FIGURES 7, 8 and 9 is similar to the previous embodiment described herein, the principal difference being in the use of a resilient annular member 90 mounted on hub 30 and seating on its external side against snap ring 92 in groove 94 of the hub. On the inner side of member 90 is a rigid ring 96 having equally spaced threaded holes for receiving cap screws 98, 100 and 102 extending through matching holes in annular member 90. The holes in member 90 are not threaded and are sufficiently large to permit the screws to pass easily therethrough. When the unit is assembled in the manner illustrated in FIGURE 8, cap screws 98, 100 and 102 are tightened against plate 48, deflecting resilient member 90 from the position shown in FIGURE 8 to a position similar to that shown in FIGURE 9 and applying sufficient pressure on the external surface of plate 48 to press plate 46 against annular abutments 58, and consequently press plates 46 and 48 firmly into contact with the external surface of sprocket plate 38 to obtain the desired maximum torque limit setting on the unit. The form shown in FIGURE 10 is substantially the same as that shown in FIGURES 7, 8 and 9, the primary difference consisting of the use of individual nuts 110 on each of the screws 98, 100 and 102. The nuts may be held against rotation and accidental loosening by a suitable lock washer or the like seated against the internal surface of resilient plate 90.

Resilient rings 60 and 90 may be of various shapes and configurations consistent with requirements for yieldably urging plates 38, 46 and 48 together for determining the maximum torque load on the drive mechanism. For example, the ring 120 shown in FIGURES 11 and 12 includes radial resilient projections 122, 124 and 126 for yieldably supporting the adjustment screws or the like. The projections are connected to a rigid hub 128 mounted on the hub 30 and secured thereto by screw threads or other suitable abutments. With the exception of bearing 42 and the friction material, steel is preferably used for the sprocket shown, although any other suitable material may be used to suit requirements.

The description herein has been directed to a sprocket assembly; however, the hub and torque limiting mechanism can be used in their entirety without change for a V-belt, sheave, pulley or gear by merely substituting for the sprocket plate 38 a pulley or gear element having an internal hub portion A similar to those shown on the sprocket plates. While several variations and modifications have been described in detail herein, additional changes and modifications may be made to suit requirements.

I claim:

1. A torque limiting mechanism for use in combination with sprockets, sheaves, pulleys, gears and the like, comprising a hub, a pair of spaced abutment means on said hub, a pair of annular pressure plates on said hub disposed between said abutment means and being longitudinally movable on said hub, a drive plate rotatably mounted on said hub between said pressure plates, a resilient member mounted on said hub against one of said abutment means, and a plurality of adjustment means supported by said member for applying a yieldable force on said plates.

2. A torque limiting mechanism for use in combination with sprockets, sheaves, pulleys, gears and the like, comprising a hub, a pair of spaced abutment means on said hub, a pair of annular pressure plates on said hub disposed between said abutment means and splined to said hub, a disc-shaped drive plate rotatably mounted on said hub between said pressure plates, a resilient means mounted on said hub against one of said abutment means, and a plurality of annularly spaced adjustment means supported by said resilient means for applying a yieldable force on said plates.

3. A torque limiting mechanism for use in combination with sprockets, sheaves, pulleys, gears and the like, comprising a hub, a pair of spaced abutment means on said hub, a pair of annular pressure plates on said hub disposed between said abutment means and splined to said hub, a disc-shaped drive plate rotatably mounted on said hub between said pressure plates, an annular resilient member mounted on said hub against one of said abutment means, and a plurality of adjustment screws extending through said resilient member and threadedly received therein for applying a yieldable force on said plates.

4. A torque limiting mechanism for use in combination with sprockets, sheaves, pulleys, gears and the like, comprising a cylindrically-shaped hub having a longitudinal bore therethrough and a plurality of grooves and annular abutment means on the external surface thereof, an abutment means on said hub spaced from said first abutment means, a pair of annular pressure plates on said hub disposed between said abutment means and having lug means extending into said longitudinal grooves, a disc-shaped drive plate rotatably mounted on said hub between said pressure plates, an annular resilient member mounted on said hub against one of said abutment means, and a plurality of adjustment means extending through said resilient member and threadedly received therein for applying a yieldable force on said plates.

5. A torque limiting mechanism for use in combination with sprockets, sheaves, pulleys, gears and the like, comprising a hub, a pair of annular pressure plates on said hub, one of which is movable longitudinally, a drive plate rotatably mounted on said hub between said pressure plates, a resilient means mounted on said hub and secured thereto, and a plurality of spaced adjustment means mounted on and supported by said resilient means for applying a yieldable force on said plates.

6. A torque limiting mechanism for use in combination with sprockets, sheaves, pulleys, gears and the like, comprising a hub, a pair of spaced abutment means on said hub, a pair of annular pressure plates on said hub, one of which is movable longitudinally, a drive plate rotatably mounted on said hub between said pressure plates, a resilient means mounted on said hub against one of said abutment means, and a plurality of spaced adjustment means on said resilient means and operatively connected to said movable pressure plate.

7. A torque limiting mechanism for use in combination with sprockets, sheaves, pulleys, gears and the like, comprising a cylindrically-shaped hub having a longitudinal bore therethrough and a plurality of longitudinal grooves and an annular abutment means on the external surface, a threaded portion on the external surface of said hub spaced from said abutment means, a pair of annular pressure plates on said hub disposed between said abutment means and said threaded portion and having friction material on their inner side surfaces and lug means extending into said longitudinal grooves, a disc-shaped drive plate rotatably mounted on said hub between said pressure plates, an annular resilient member mounted on the threaded portion of said hub, and a plurality of adjustment screws extending through said resilient member and threadedly received therein for applying a yieldable force on said plates, thereby varying said force to obtain a desired predetermined maximum torque setting on said mechanism.

8. A torque limiting mechanism for use in combination with sprockets, sheaves, pulleys, gears and the like, comprising a hub, a pair of spaced abutment means on said hub, a pair of annular pressure plates on said hub disposed between said abutment means and splined to said hub, a disc-shaped drive plate rotatably mounted on said hub between said pressure plates, a resilient member mounted on said hub against one of said abutment means, a ring member disposed between said resilient member and the adjacent plate, and a plurality of adjustment screws extending through said resilient member and threadedly received in said ring member for applying a yieldable force to said plates.

9. A torque limiting mechanism for use in combination with sprockets, sheaves, pulleys, gears and the like, comprising a hub, a pair of spaced abutment means on said hub, a pair of annular pressure plates on said hub, one of which is movable longitudinally, a drive plate rotatably mounted on said hub between said pressure plates, a resilient member, a ring member disposed between said resilient member and the adjacent plate, and a plurality of adjustment screws extending through said resilient member and threadedly received in said ring member for applying a yieldable force on said plates.

References Cited in the file of this patent

UNITED STATES PATENTS

| | | |
|---|---|---|
| 755,953 | Smith | Mar. 29, 1904 |
| 1,575,637 | Neth | Mar. 9, 1926 |
| 2,659,220 | Cherry | Nov. 17, 1953 |
| 2,779,175 | Le Hew | Jan. 29, 1957 |